US006917611B2

United States Patent
Dorenbosch et al.

(10) Patent No.: US 6,917,611 B2
(45) Date of Patent: Jul. 12, 2005

(54) METHOD AND APPARATUS FOR SWITCHING AN ON GOING COMMUNICATION OF USER INFORMATION BETWEEN A WIRELESS CONNECTION AND A WIRED CONNECTION

(75) Inventors: Jheroen P. Dorenbosch, Paradise, TX (US); Elizabeth A. Lytle, Palo Alto, CA (US)

(73) Assignee: Motorola, Inc., Schaumburg, IL (US)

( * ) Notice: Subject to any disclaimer, the term of this patent is extended or adjusted under 35 U.S.C. 154(b) by 649 days.

(21) Appl. No.: 09/788,192

(22) Filed: Feb. 17, 2001

(65) Prior Publication Data

US 2002/0114317 A1 Aug. 22, 2002

(51) Int. Cl.[7] .............................................. H04L 12/66
(52) U.S. Cl. .................................... 370/352; 370/401
(58) Field of Search ................................ 370/352, 389, 370/329, 463, 400, 401, 338, 310, 465, 442, 337, 321; 455/426, 427, 428, 552, 555

(56) References Cited

U.S. PATENT DOCUMENTS

| | | | | |
|---|---|---|---|---|
| 5,602,843 A | * | 2/1997 | Gray | ........................ 370/338 |
| 5,983,098 A | * | 11/1999 | Gerszberg et al. | .......... 455/426 |
| 6,021,433 A | | 2/2000 | Payne et al. | |
| 6,185,205 B1 | | 2/2001 | Sharrit et al. | |
| 6,219,539 B1 | * | 4/2001 | Basu et al. | .................. 455/417 |
| 6,477,150 B1 | * | 11/2002 | Maggenti et al. | ........... 370/312 |
| 6,487,181 B1 | * | 11/2002 | Johnson et al. | ............. 370/311 |

OTHER PUBLICATIONS

R. Doms, Dynamic Host Configuration Protocol, RFC 2131, Mar. 1997, Bucknell University, U.S.A..
M. Handley et al., SIP: Session Initiation Protocol, RFC 2543, ITEF Network Working Group, Mar. 1999, U.S.A..

* cited by examiner

Primary Examiner—Chi Pham
Assistant Examiner—Alexander O. Boakye
(74) Attorney, Agent, or Firm—R. Louis Breeden; Matthew C. Loppnow

(57) ABSTRACT

A mobile station (MS) (100) is capable of communicating user information through both a wireless connection (224) and a wired connection (222). The MS establishes (502), between the MS and a communication device coupled to the communication system, a first one of the wireless connection and the wired connection, the wired connection existing through a wired local area network (LAN). The MS communicates (504) a first portion of the user information between the MS and the communication device through the first one of the wireless connection and the wired connection. Subsequently, the MS establishes (506), between the MS and the communication device a second one of the wireless connection and the wired connection, the second one different from the first one. The MS then communicates (508) a second portion of the user information through the second one of the wireless connection and the wired connection.

18 Claims, 3 Drawing Sheets

METHOD AND APPARATUS FOR SWITCHING AN ON GOING COMMUNICATION OF USER INFORMATION BETWEEN A WIRELESS CONNECTION AND A WIRED CONNECTION

FILED OF THE INVENTION

This invention relates in general to communication systems, and more specifically to a method and apparatus for switching an ongoing communication of user information between a wireless connection and a wired connection.

BACKGROUND OF THE INVENTION

Wireless communication devices can now handle voice-over-internet-protocol (VoIP) calls, and soon will be able to handle multimedia (voice, graphics, video) calls. Such calls, however, require large bandwidth and hence a high quality connection.

Unfortunately, a high quality wireless connection is not always available, especially indoors from where many calls tend to be made. Thus, what is needed is a way to provide a high quality connection to a mobile communication device indoors.

DETAILED DESCRIPTION OF THE DRAWINGS

Figure 1:
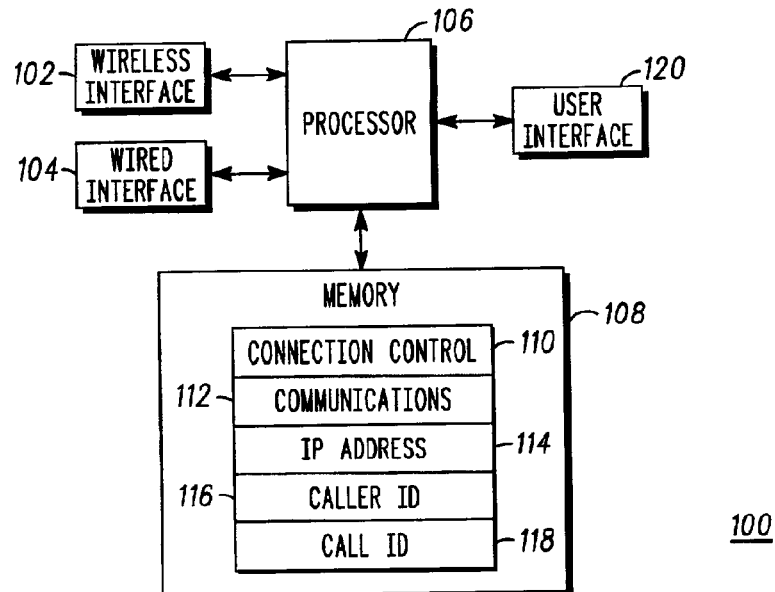
FIG. 1 is an exemplary electrical block diagram of a mobile station in accordance with the present invention.

Referring to FIG. 1, an exemplary electrical block diagram depicts a mobile station 100 in accordance with the present invention. The mobile station (MS) 100 comprises a wireless interface 102 and a wired interface 104, both coupled to a conventional processor 106. The wireless interface 102 preferably comprises a conventional radio transceiver. Alternatively, the wireless interface 102 can include at least one of a radio transmitter, a radio receiver, an optical transmitter, an optical receiver, an ultrasonic transmitter, and an ultrasonic receiver. The wired interface 104 preferably comprises a conventional Fast Ethernet transceiver for communicating with a wired local area network (LAN). Alternatively, the wired interface 104 can comprise a conventional fiber optics transceiver. The processor 106 is also coupled to a conventional user interface 120 for interfacing with a user. The user interface 120 preferably includes at least one of a microphone, an earpiece, a display, and a keyboard. Alternatively, other user interface devices, such as a headset, a mouse, and a trackball can be used for the user interface 120, as well. It will be appreciated that, as a further alternative, the wired interface 104 can comprise a short range wireless device, e.g., an optical, Bluetooth, or ultrasonic transceiver, for communicating between the MS 100 and the wired LAN. This link preferably is transparent with regard to the communications.

The processor 106 is further coupled to a memory 108 comprising software for programming the processor 106 and space for storing variables utilized in accordance with the present invention. It will be appreciated that, alternatively, the memory 108 can be manufactured as an integral part of the processor 106, as well. The memory 108 comprises a connection control program 110 for programming the processor 106 to form a wireless connection and a wired connection in accordance with the present invention. The memory 108 further comprises a communications program 112 for programming the processor 106 to communicate according to a protocol utilized by a communication system in which the mobile station 100 operates, e.g., one of a packet switched wireless connection and a circuit switched wireless connection, along with a packet switched wired connection. The memory 108 also includes a space for storing an Internet Protocol (IP) address 114 used by the mobile station 100. In addition, the memory 108 includes space for storing a caller identifier (ID) 116 and a call ID 118. Operation of the mobile station 100 will be described further herein below.

Figure 2:
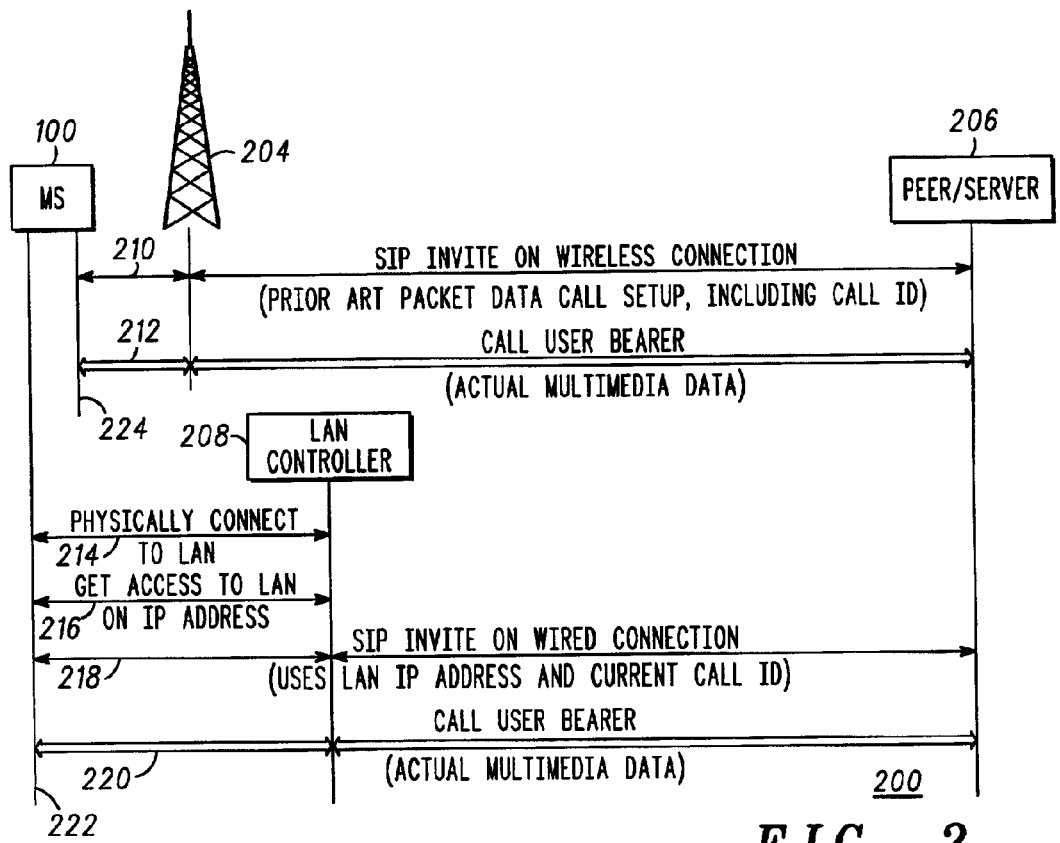
FIGS. 2–4 are exemplary call setup diagrams in accordance with the present invention.

Referring to FIG. 2, a call setup diagram 200 depicts operation of the MS 100 in a packet data wireless connection with a packet data peer or server 206 in accordance with the present invention. Depicted at the top of the diagram 200 are the MS 100, a base station 204, and the peer or server 206. The base station 204 is preferably part of a wireless wide area network (WAN), such as a cellular telephone system. A vertical line represents the wireless connection 224 at the MS 100, while another vertical line represents the wired connection 222. To initiate the packet data wireless connection, the MS 100 preferably sends 210 to the peer or server 206 on the wireless connection 224 a conventional Session Initiation Protocol (SIP) INVITE command containing the IP address assigned to the MS 100 for use on the wireless connection, and a call ID. The SIP INVITE is described in RFC 2543 of the Internet Engineering Task Force (IETF), which is readily available on the Internet. Multimedia data, e.g., VoIP, graphics, or video, is then subsequently exchanged 212 over the wireless connection, using the IP addresses of the MS 100 and the peer or server 206. It will be appreciated that, alternatively, the packet data wireless connection can be initiated by the peer or server 206, or through a different IP protocol, such as the H.323 standard of the International Telecommunications Union (ITU), which standard is also readily available on the Internet.

If during the call the MS 100 moves into a building in which a local area network (LAN) is available, the user may benefit from physically connecting 214 the wired interface 104 of the MS 100 to the LAN. This is because multimedia data requires a high quality connection, which often is not available indoors from a wireless WAN. The LAN controller 208 then assigns 216 an IP address to the MS 100 in accordance with, for example, the Dynamic Host Configuration Protocol (DCHP) as described in IETF RFC 2131, also readily available on the Internet. The MS 100 then sends 218 to the peer or server 206 over the wired connection 222 a SIP INVITE containing the newly assigned IP address and the call ID assigned during initiation of the wireless connection. In response, the peer or server 206 will start communicating 220 with the MS 100 via the wired connection 222, using the newly assigned IP address, thereby advantageously regaining the high quality connection required for multimedia. It will be appreciated that, should the MS user subsequently need to leave the building, the MS 100 can be switched back to the wireless connection 224, e.g., through a simple user command, and disconnected from the LAN. To switch back to the wireless connection 224, the MS 100 preferably will send another SIP INVITE over the wireless connection 224. The SIP INVITE will be similar to the one used to set up the original wireless connection, the essential difference being that the current call ID will be supplied by the MS 100 to indicate that the call is already in progress, along with the IP address used for the wireless connection.

Figure 3:
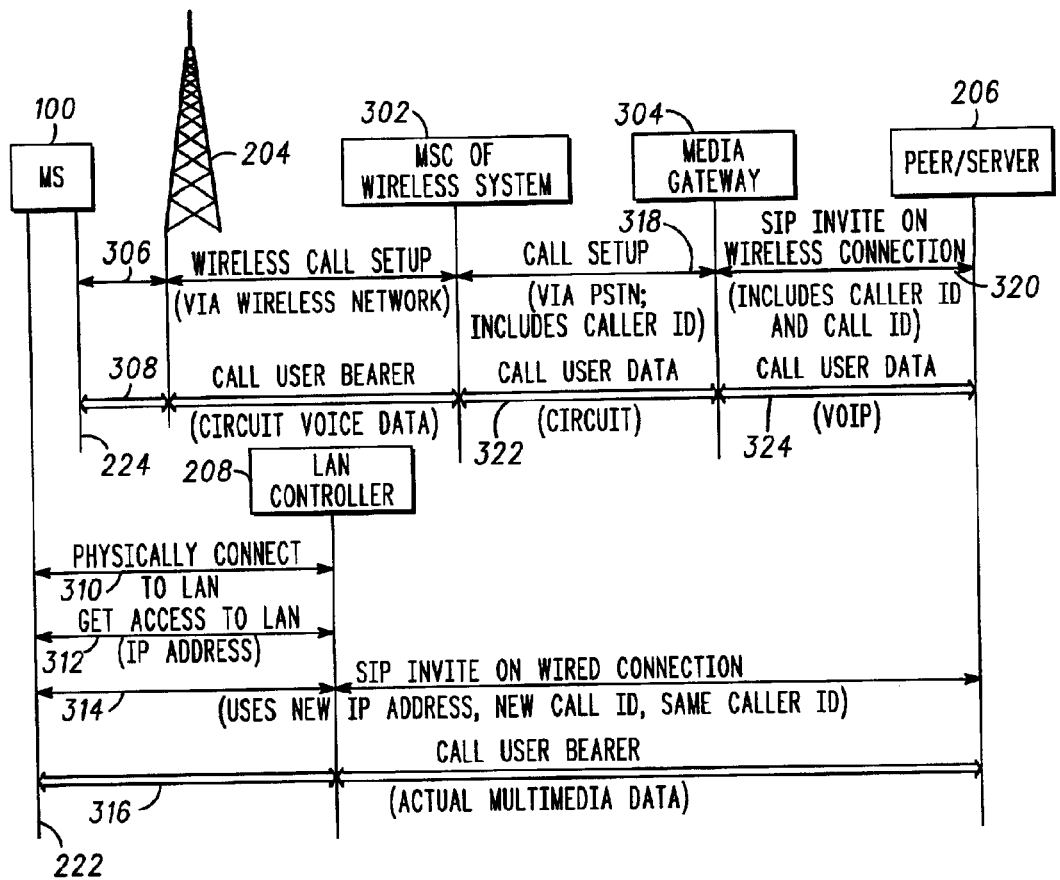

Referring to FIG. 3, a call setup diagram 300 depicts operation of the MS 100 in a circuit switched wireless connection with the packet data peer or server 206 in accordance with the present invention. The diagram 300 depicts two new components for making conversions between connection types: a conventional mobile system controller (MSC) 302 and a conventional media gateway 304. The MS 100 begins by making 306 a conventional wireless call setup to the peer or server 206 through the MSC 302. The conventional call setup messages include the caller ID of the MS 100. In response, the MSC 302 passes 318 the call setup information to the media gateway 304 via the public switched telephone network (PSTN). In response, the media gateway 304 sends 320 to the peer or server 206 a SIP INVITE containing the caller ID and a call ID. The call ID is not known by the MS 100, but the caller ID is known. Call user data communication preferably takes the form of VoIP 324 between the peer or server 206 and the media gateway 304, and takes the form of circuit switched voice in the paths 322, 308 between the media gateway 304 and the MS 100.

If during the call the MS 100 moves into a building in which a local area network (LAN) is available, the user may benefit from physically connecting 310 the wired interface 104 of the MS 100 to the LAN. The LAN controller 208 then assigns 312 an IP address to the MS 100 in accordance with, for example, the Dynamic Host Configuration Protocol (DCHP) as described in IETF RFC 2131. The MS 100 then sends 314 to the peer or server 206 over the wired connection 222 a SIP INVITE containing the newly assigned IP address, a new call ID, and the same caller ID used for the wireless connection. In response, the peer or server 206 will start communicating 316 with the MS 100 via the wired connection 222, using the newly assigned IP address, thereby advantageously regaining the high quality connection required for multimedia data. It will be appreciated that, should the MS user subsequently need to leave the building, the MS 100 can be switched back to the wireless connection 224 and disconnected from the LAN. The MS 100 preferably will reestablish the wireless connection in a manner similar to that used to originally setup the call, and the peer or server 206 will recognize from the caller ID that the call is already in progress.

Figure 4:
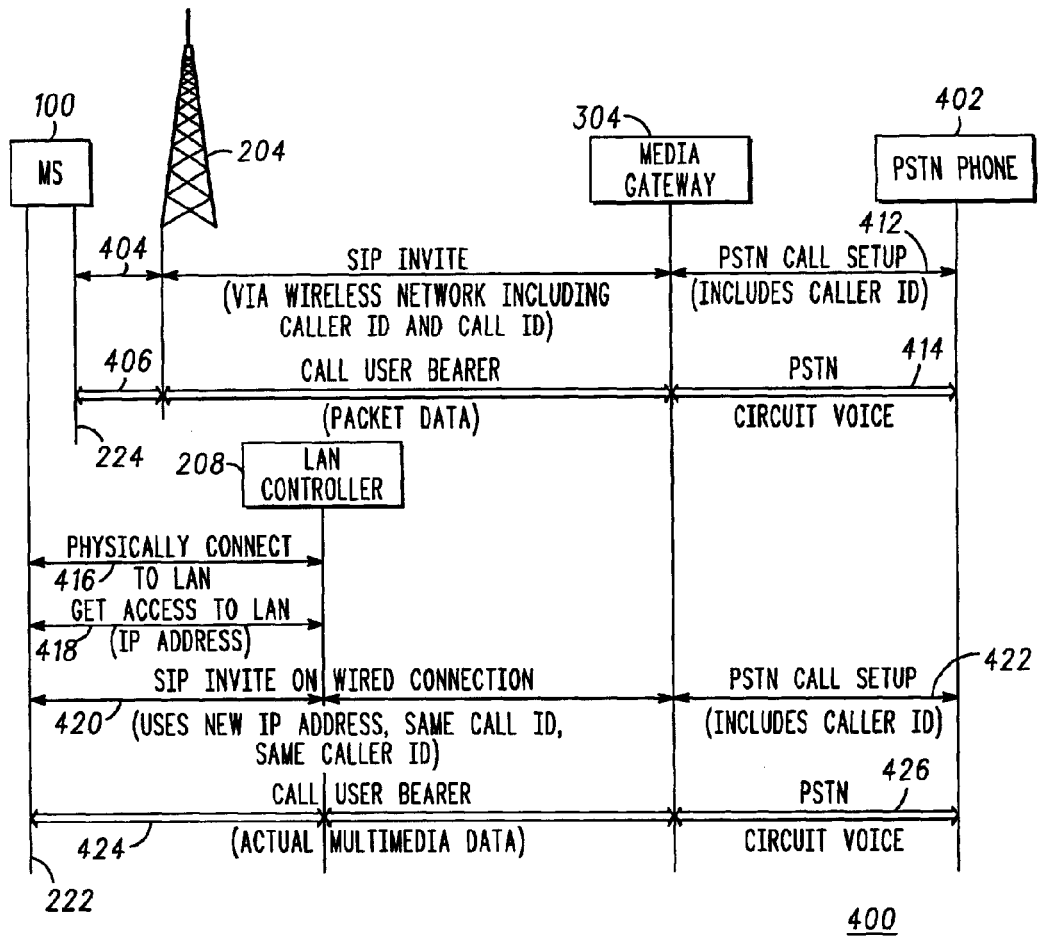

Referring to FIG. 4, a call setup diagram 400 depicts operation of the MS 100 in a packet data wireless connection with a PSTN phone 402 in accordance with the present invention. The MS 100 begins by sending 404 to the media gateway 304 a SIP INVITE including the destination PSTN phone number, a caller ID and a call ID. The media gateway 304 then translates 412 the call setup into a PSTN call setup for communicating with the PSTN phone 402. The wireless connection 224 of the MS 100 communicates 406 with the media gateway 304 using packet data (e.g., VoIP), and the PSTN phone 402 communicates 414 with the media gateway using PSTN circuit switched voice.

If during the call the MS 100 moves into a building in which a local area network (LAN) is available, the user may benefit from physically connecting 416 the wired interface 104 of the MS 100 to the LAN. The LAN controller 208 then assigns 418 an IP address to the MS 100 in accordance with, for example, the Dynamic Host Configuration Protocol (DCHP) as described in IETF RFC 2131. The MS 100 then sends 420 to the media gateway over the wired connection 222 a SIP INVITE containing the newly assigned IP address, the same call ID, and the same caller ID. In response, the media gateway will generate 422 a new PSTN call setup to the PSTN phone. To the PSTN phone this will look like a second call coming in (preferably announced by call waiting) with the same caller ID. The user of the MS 100 will likely encourage the PSTN phone user to answer the second call. When the PSTN user switches to the second call, the PSTN phone 402 will communicate 426 with the media gateway 304 through the PSTN using circuit switched voice, and the media gateway will start communicating 424 with the MS 100 via the wired connection 222, using the new IP address, thereby advantageously regaining the high quality connection required for VoIP. It will be appreciated that, should the MS user subsequently need to leave the building, the MS 100 can be switched back to the wireless connection 224 and disconnected from the LAN. The MS 100 preferably will reestablish the wireless connection in a manner similar to that used to originally setup the call, and the PSTN phone user will answer the reestablished call after receiving a call waiting alert.

Figure 5:
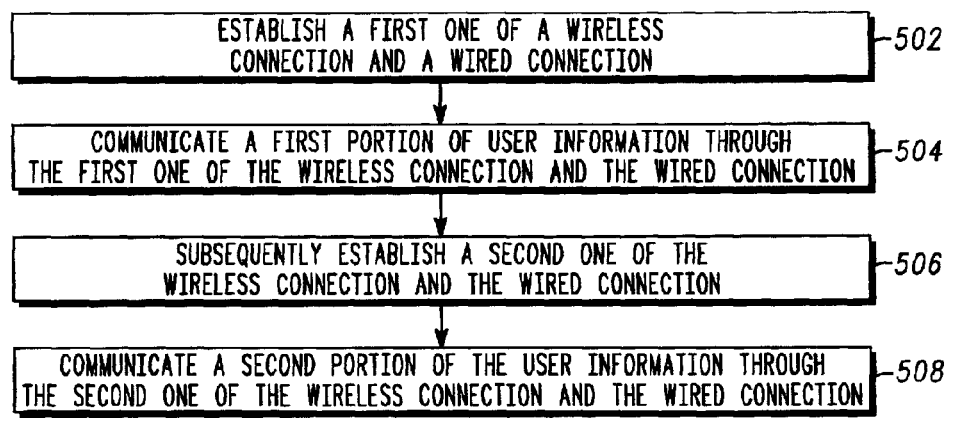
FIG. 5 is an exemplary flow chart depicting operation of the mobile station in accordance with the present invention.

Referring to FIG. 5, an exemplary flow chart 500 depicts operation of the mobile station 100 in a communication system in accordance with the present invention. The flow begins with the MS 100 establishing 502, between the MS 100 and a communication device coupled to the communication system, a first one of a wireless connection and a wired connection, the wired connection existing through a wired local area network (LAN). The MS 100 and the communication device then communicate a first portion of user information, which preferably comprises real-time multimedia communication, between the MS 100 and the communication device through the first one of the wireless connection and the wired connection. Subsequently, the MS 100 and the communication device establish, between the MS 100 and the communication device a second one of the wireless connection and the wired connection, the second one different from the first one. The second one is preferably established by sending from the MS 100 an INVITE command in accordance with the Session Initiation Protocol (SIP), the INVITE command including an Internet Protocol (IP) address, and at least one of a call identifier and a caller identifier. The MS 100 and the communication device then communicate a second portion of the user information through the second one of the wireless connection and the wired connection.

It should be clear from the preceding disclosure that the present invention provides a method and apparatus for switching an ongoing communication of user information between a wireless connection and a wired connection. This advantageously allows a mobile station to maintain a high quality connection when indoors. This ability to switch between a wireless connection and a wired connection is particularly advantageous for multimedia communications, which can require high bandwidth.

Many modifications and variations of the present invention are possible in light of the above teachings. Thus, it is to be understood that, within the scope of the appended claims, the invention can be practiced other than as specifically described herein above.

What is claimed is:

1. A method in a communication system including a mobile station (MS) capable of communicating through both a wireless connection and a wired connection, the method for switching an ongoing communication of user information between the wireless connection and the wired connection, the method comprising the steps of:

establishing, between the MS and a communication device coupled to the communication system, a first one of the wireless connection and the wired connection, the wired connection existing through a wired local area network (LAN);

communicating a first portion of the user information between the MS and the communication device through said first one of the wireless connection and the wired connection;

subsequently establishing, between the MS and the communication device a second one of the wireless connection and the wired connection, said second one different from said first one; and communicating a second portion of the user information through said second one of the wireless connection and the wired connection.

2. The method of claim 1, wherein the user information comprises a real-time multimedia communication.

3. The method of claim 1, wherein the step of establishing the second one of the wireless connection and the wired connection comprises the step of sending from the MS an INVITE command in accordance with Session Initiation Protocol (SIP), the INVITE command including an Internet Protocol (IP) address, and at least one of a call identifier and a caller identifier.

4. A mobile station (MS) capable of communicating with a communication system through both a wireless connection and a wired connection, the MS arranged for switching an ongoing communication of user information between the wireless connection and the wired connection, the MS comprising:

a wireless interface for making the wireless connection;

a wired interface for making the wired connection; and a processor coupled to the wireless interface and coupled to the wired interface for controlling the MS, wherein the processor is programmed to cooperate with the wired and wireless interfaces to:

establish, between the MS and a communication device coupled to the communication system, a first one of the wireless connection and the wired connection, the wired connection existing through a wired local area network (LAN);

communicate a first portion of the user information between the MS and the communication device through said first one of the wireless connection and the wired connection;

subsequently establish, between the MS and the communication device a second one of the wireless connection and the wired connection, said second one different from said first one; and communicate a second portion of the user information through said second one of the wireless connection and the wired connection.

5. The MS of claim 4, wherein the user information comprises a real-time multimedia communication.

6. The MS of claim 4, wherein in establishing the second one of the wireless connection and the wired connection, the processor is further programmed to:

send from the MS an INVITE command in accordance with Session Initiation Protocol (SIP), the INVITE command including an Internet Protocol (IP) address, and at least one of a call identifier and a caller identifier.

7. The MS of claim 4, wherein the wired interface comprises a short-range wireless device for communicating between the MS and the LAN.

8. A module in a mobile station (MS) capable of communicating with a communication system through both a wireless connection and a wired connection, the module arranged for switching an ongoing communication of user information between the wireless connection and the wired connection, the module comprising:

a wireless interface for making the wireless connection;

a wired interface for making the wired connection; and a processor coupled to the wireless interface and coupled to the wired interface for controlling the MS, wherein the processor is programmed to cooperate with the wired and wireless interfaces to:

establish, between the MS and a communication device coupled to the communication system, a first one of the wireless connection and the wired connection, the wired connection existing through a wired local area network (LAN);

communicate a first portion of the user information between the MS and the communication device through said first one of the wireless connection and the wired connection;

subsequently establish, between the MS and the communication device a second one of the wireless connection and the wired connection, said second one different from said first one; and communicate a second portion of the user information through said second one of the wireless connection and the wired connection.

9. The module of claim 8, wherein the user information comprises a real-time multimedia communication.

10. The module of claim 8, wherein in establishing the second one of the wireless connection and the wired connection, the processor is further programmed to:

send from the MS an INVITE command in accordance with Session Initiation Protocol (SIP), the INVITE command including an Internet Protocol (IP) address, and at least one of a call identifier and a caller identifier.

11. The module of claim 8, wherein the wired interface comprises a short-range wireless device for communicating between the MS and the LAN.

12. A method using a mobile station capable of communicating through both a wireless connection and a wired connection, the method for switching an ongoing communication between the wireless connection and the wired connection, the method comprising the steps of:

establishing, between the mobile station and a communication device coupled to the communication system, a first one of the wireless connection and the wired connection, the wired connection existing through a wired local area network;

communicating a first portion of the communication between mobile station and the communication device through said first one of the wireless connection and the wired connection to establish the ongoing communication;

subsequently establishing, between the mobile station and the communication device a second one of the wireless connection and the wired connection, said second one different from said first one;

switching the ongoing communication between the first one of the wireless connection and the wired connection and the second one of the wireless connection and the wired connection; and communicating a second portion of the user information through said second one of the wireless connection and the wired connection.

13. The method according to claim 12, wherein the communication comprises a real-time multimedia communication.

14. The method according to claim 12, wherein the step of establishing the second one of the wireless connection and the wired connection comprises the step of sending from the mobile station an INVITE command in accordance with Session Initiation Protocol, the INVITE command including an Internet Protocol address, and at least one of a call identifier and a caller identifier.

15. The method according to claim 12, wherein the step of establishing a first one of the wireless connection and the wired connection further comprises establishing a wireless connection.

16. The method according to claim 15, wherein the step of subsequently establishing a second one of the wireless connection and the wired connection further comprises establishing a local area network connection by physically connecting a wired interface of the mobile station to a local area network.

17. The method according to claim 12, wherein the step of establishing a first one of the wireless connection and the wired connection further comprises establishing a wired connection.

18. The method according to claim 17, wherein the step of subsequently establishing a second one of the wireless connection and the wired connection further comprises establishing a wireless connection.

\* \* \* \* \*